US 10,937,076 B2

United States Patent
Glass et al.

(10) Patent No.: US 10,937,076 B2
(45) Date of Patent: Mar. 2, 2021

(54) ONLINE PERSONALIZED GIFTING SYSTEM

(71) Applicant: e2interactive, Inc., Atlanta, GA (US)

(72) Inventors: Brett R. Glass, Kansas City, MO (US); Nicole E. Glass, Kansas City, MO (US)

(*) Notice: Subject to any disclaimer, the term of this patent is extended or adjusted under 35 U.S.C. 154(b) by 0 days.

(21) Appl. No.: 15/943,066

(22) Filed: Apr. 2, 2018

(65) Prior Publication Data
US 2018/0225735 A1    Aug. 9, 2018

Related U.S. Application Data (60) Continuation of application No. 14/682,405, filed on Apr. 9, 2015, now Pat. No. 9,934,525, which is a division of application No. 13/273,220, filed on Oct. 13, 2011, now Pat. No. 9,031,869.

(60) Provisional application No. 61/392,933, filed on Oct. 13, 2010.

(51) Int. Cl.
| | |
|---|---|
| *G06Q 30/06* | (2012.01) |
| *G06F 16/54* | (2019.01) |
| *G06F 3/0482* | (2013.01) |
| *G06F 3/0484* | (2013.01) |

(52) U.S. Cl.
CPC ....... *G06Q 30/0621* (2013.01); *G06F 3/0482* (2013.01); *G06F 3/04842* (2013.01); *G06F 16/54* (2019.01); *G06Q 30/0641* (2013.01)

(58) Field of Classification Search
CPC ..... G06Q 30/06; G06Q 30/0601–0643; G06Q 30/08; G06Q 30/0621; G06Q 30/0641; G06Q 30/0207; G06F 16/54; G06F 3/0482; G06F 3/04842
See application file for complete search history.

(56) References Cited

U.S. PATENT DOCUMENTS

| | | |
|---|---|---|
| 794,417 A | 6/1905 | Maniachi |
| 3,288,350 A | 11/1966 | Kushner |
| 4,068,213 A | 1/1978 | Nakamura et al. |
| 4,482,802 A | 11/1984 | Aizawa et al. |
| 4,734,858 A | 3/1988 | Schlafly |
| 4,747,049 A | 5/1988 | Richardson et al. |
| 4,755,940 A | 7/1988 | Brachtl et al. |
| 4,767,917 A | 8/1988 | Ushikubo |
| 4,795,892 A | 1/1989 | Gilmore et al. |
| 4,877,947 A | 10/1989 | Mori |
| 4,900,904 A | 2/1990 | Wright et al. |
| 4,908,521 A | 3/1990 | Boggan et al. |

(Continued)

FOREIGN PATENT DOCUMENTS

| | | |
|---|---|---|
| EP | 0950968 A4 | 5/2004 |
| EP | 1519332 A1 | 3/2005 |

(Continued)

OTHER PUBLICATIONS

Eazel, William, "Paypal intros SMS Payments," http://www.v3co.uk/articles/print/2152694, vnunet.com, Mar. 24, 2006, 1 page.

(Continued)

*Primary Examiner* — William J Allen
(74) *Attorney, Agent, or Firm* — Landmark Intellectual Property Law, PLLC; Gregory Murphy (57) ABSTRACT

An online personalized gifting system for providing gift card related packaging formats to enhance the customer experience relating to online gift card sales.

13 Claims, 3 Drawing Sheets

Personalized Gift Card Holder Process Flow (56) References Cited

U.S. PATENT DOCUMENTS

| | | |
|---|---|---|
| 4,943,707 A | 7/1990 | Boggan |
| 5,091,634 A | 2/1992 | Finch et al. |
| 5,117,355 A | 5/1992 | McCarthy |
| 5,202,826 A | 4/1993 | McCarthy |
| 5,255,182 A | 10/1993 | Adams |
| 5,256,863 A | 10/1993 | Ferguson et al. |
| 5,311,424 A | 5/1994 | Mukherjee et al. |
| 5,367,148 A | 11/1994 | Storch et al. |
| 5,375,240 A | 12/1994 | Grundy |
| 5,383,113 A | 1/1995 | Kight et al. |
| 5,384,449 A | 1/1995 | Peirce |
| 5,465,288 A | 11/1995 | Falvey et al. |
| 5,477,038 A | 12/1995 | Levine et al. |
| 5,500,513 A | 3/1996 | Langhans et al. |
| 5,502,765 A | 3/1996 | Ishiguro et al. |
| 5,511,114 A | 4/1996 | Stimson et al. |
| 5,577,109 A | 11/1996 | Stimson et al. |
| 5,581,064 A | 12/1996 | Riley et al. |
| 5,590,038 A | 12/1996 | Pitroda |
| 5,602,377 A | 2/1997 | Beller et al. |
| 5,619,559 A | 4/1997 | Kennedy |
| 5,621,201 A | 4/1997 | Langhans et al. |
| 5,621,787 A | 4/1997 | McKoy et al. |
| 5,644,721 A | 7/1997 | Chung et al. |
| 5,657,389 A | 8/1997 | Houvener |
| 5,671,279 A | 9/1997 | Elgamal |
| 5,679,938 A | 10/1997 | Templeton et al. |
| 5,679,940 A | 10/1997 | Templeton et al. |
| 5,696,909 A | 12/1997 | Wallner |
| 5,699,528 A | 12/1997 | Hogan |
| 5,705,798 A | 1/1998 | Tarbox |
| 5,708,780 A | 1/1998 | Levergood et al. |
| 5,721,768 A | 2/1998 | Stimson et al. |
| 5,721,781 A | 2/1998 | Deo et al. |
| 5,729,693 A | 3/1998 | Holda-Fleck |
| 5,732,136 A | 3/1998 | Murphree et al. |
| 5,734,719 A | 3/1998 | Tsevdos et al. |
| 5,740,915 A | 4/1998 | Williams |
| 5,754,655 A | 5/1998 | Hughes et al. |
| 5,760,381 A | 6/1998 | Stich et al. |
| 5,777,305 A | 7/1998 | Smith et al. |
| 5,799,285 A | 8/1998 | Klingman |
| 5,806,045 A | 9/1998 | Biorge et al. |
| 5,828,740 A | 10/1998 | Khuc et al. |
| 5,844,972 A | 12/1998 | Jagadish et al. |
| 5,850,217 A | 12/1998 | Cole |
| 5,857,175 A | 1/1999 | Day et al. |
| 5,873,072 A | 2/1999 | Kight et al. |
| 5,878,401 A | 3/1999 | Joseph |
| 5,884,271 A | 3/1999 | Pitroda |
| 5,889,270 A | 3/1999 | Haagen et al. |
| 5,889,863 A | 3/1999 | Weber |
| 5,897,625 A | 4/1999 | Gustin et al. |
| 5,903,633 A | 5/1999 | Lorsch |
| 5,903,830 A | 5/1999 | Joao et al. |
| 5,903,874 A | 5/1999 | Leonard et al. |
| 5,907,142 A | 5/1999 | Kelsey |
| 5,909,492 A | 6/1999 | Payne et al. |
| 5,913,210 A | 6/1999 | Call |
| 5,918,213 A | 6/1999 | Bernard et al. |
| 5,930,363 A | 7/1999 | Stanford et al. |
| 5,945,653 A | 8/1999 | Walker et al. |
| 5,950,173 A | 9/1999 | Perkowski |
| 5,953,710 A | 9/1999 | Fleming |
| 5,956,695 A | 9/1999 | Carrithers et al. |
| 5,956,700 A | 9/1999 | Landry |
| 5,968,110 A | 10/1999 | Westrope et al. |
| 5,984,508 A | 11/1999 | Hurley |
| 5,988,509 A | 11/1999 | Taskett |
| 5,991,413 A | 11/1999 | Arditti et al. |
| 5,991,748 A | 11/1999 | Taskett |
| 5,991,749 A | 11/1999 | Morrill, Jr. |
| 5,999,624 A | 12/1999 | Hopkins |
| 6,000,608 A | 12/1999 | Dort |
| 6,012,049 A | 1/2000 | Kawan |
| 6,018,570 A | 1/2000 | Matison |
| 6,025,780 A | 2/2000 | Bowers et al. |
| 6,029,139 A | 2/2000 | Cunningham et al. |
| 6,029,141 A | 2/2000 | Bezos et al. |
| 6,029,151 A | 2/2000 | Nikander |
| 6,032,135 A | 2/2000 | Molano et al. |
| 6,032,859 A | 3/2000 | Muehlberger et al. |
| 6,039,244 A | 3/2000 | Finsterwald |
| 6,049,778 A | 4/2000 | Walker et al. |
| 6,055,511 A | 4/2000 | Luebbering et al. |
| 6,055,567 A | 4/2000 | Ganesan et al. |
| 6,058,300 A | 5/2000 | Hanson |
| 6,058,382 A | 5/2000 | Kasai et al. |
| 6,062,472 A | 5/2000 | Cheung |
| 6,070,150 A | 5/2000 | Remington et al. |
| 6,085,167 A | 7/2000 | Iguchi |
| 6,085,242 A | 7/2000 | Chandra |
| 6,088,682 A | 7/2000 | Burke |
| 6,092,053 A | 7/2000 | Boesch et al. |
| 6,098,053 A | 8/2000 | Slater |
| 6,105,008 A | 8/2000 | Davis et al. |
| 6,119,164 A | 9/2000 | Basche |
| 6,125,352 A | 9/2000 | Franklin et al. |
| 6,129,276 A | 10/2000 | Jelen et al. |
| 6,134,533 A | 10/2000 | Shell |
| 6,138,106 A | 10/2000 | Walker et al. |
| 6,138,911 A | 10/2000 | Fredregill et al. |
| 6,142,369 A | 11/2000 | Jonstromer |
| 6,148,249 A | 11/2000 | Newman |
| 6,167,387 A | 12/2000 | Lee-Wai-Yin |
| 6,169,890 B1 | 1/2001 | Vatanen |
| 6,173,272 B1 | 1/2001 | Thomas et al. |
| 6,175,823 B1 | 1/2001 | Dusen |
| 6,185,545 B1 | 2/2001 | Resnick et al. |
| 6,188,752 B1 | 2/2001 | Lesley |
| 6,219,652 B1 | 4/2001 | Carter et al. |
| 6,222,914 B1 | 4/2001 | McMullin |
| 6,226,364 B1 | 5/2001 | O'Neil |
| 6,240,397 B1 | 5/2001 | Sachs |
| 6,256,690 B1 | 7/2001 | Carper |
| 6,282,566 B1 | 8/2001 | Lee, Jr. et al. |
| 6,285,749 B1 | 9/2001 | Manto |
| 6,289,322 B1 | 9/2001 | Kitchen et al. |
| 6,295,522 B1 | 9/2001 | Boesch |
| 6,304,860 B1 | 10/2001 | Martin, Jr. et al. |
| 6,308,887 B1 | 10/2001 | Korman et al. |
| 6,311,165 B1 | 10/2001 | Coutts et al. |
| 6,311,170 B1 | 10/2001 | Embrey |
| 6,314,171 B1 | 11/2001 | Dowens |
| 6,315,195 B1 | 11/2001 | Ramachandran |
| 6,317,028 B1 | 11/2001 | Valiulis |
| 6,324,525 B1 | 11/2001 | Kramer et al. |
| 6,327,577 B1 | 12/2001 | Garrison et al. |
| 6,330,544 B1 | 12/2001 | Walker et al. |
| 6,332,135 B1 | 12/2001 | Conklin et al. |
| 6,333,976 B2 | 12/2001 | Lesley |
| 6,334,116 B1 | 12/2001 | Ganesan et al. |
| 6,360,254 B1 | 3/2002 | Linden et al. |
| 6,363,362 B1 | 3/2002 | Burfield et al. |
| 6,363,364 B1 | 3/2002 | Nel |
| 6,366,893 B2 | 4/2002 | Hannula et al. |
| 6,375,073 B1 | 4/2002 | Aebi et al. |
| 6,422,462 B1 | 7/2002 | Cohen |
| 6,424,706 B1 | 7/2002 | Katz et al. |
| 6,434,238 B1 | 8/2002 | Chaum et al. |
| 6,442,532 B1 | 8/2002 | Kawan |
| 6,467,684 B2 | 10/2002 | Fite et al. |
| 6,473,500 B1 | 10/2002 | Risafi et al. |
| 6,473,739 B1 | 10/2002 | Showghi et al. |
| 6,494,367 B1 | 12/2002 | Zacharias |
| 6,502,745 B1 | 1/2003 | Stimson et al. |
| 6,507,823 B1 | 1/2003 | Nel |
| 6,529,956 B1 | 3/2003 | Smith et al. |
| 6,536,659 B1 | 3/2003 | Hauser et al. |
| 6,542,933 B1 | 4/2003 | Durst, Jr. et al. |
| 6,550,672 B1 | 4/2003 | Tracy et al. |
| 6,575,361 B1 | 6/2003 | Graves et al. |
| 6,581,827 B2 | 6/2003 | Welton |
| 6,591,098 B1 | 7/2003 | Shieh et al. |

(56) References Cited

U.S. PATENT DOCUMENTS

| | | |
|---|---|---|
| 6,594,640 B1 | 7/2003 | Postrel |
| 6,594,644 B1 | 7/2003 | Dusen |
| 6,609,113 B1 | 8/2003 | O'Leary et al. |
| 6,615,189 B1 | 9/2003 | Phillips et al. |
| 6,615,190 B1 | 9/2003 | Slater |
| 6,622,015 B1 | 9/2003 | Himmel et al. |
| 6,636,833 B1 | 10/2003 | Flitcroft et al. |
| 6,648,222 B2 | 11/2003 | McDonald et al. |
| 6,651,885 B1 | 11/2003 | Arias |
| 6,659,259 B2 | 12/2003 | Knox et al. |
| 6,678,664 B1 | 1/2004 | Ganesan |
| 6,684,269 B2 | 1/2004 | Wagner |
| 6,705,520 B1 | 3/2004 | Pitroda et al. |
| 6,745,022 B2 | 6/2004 | Knox |
| 6,769,607 B1 | 8/2004 | Pitroda et al. |
| 6,805,289 B2 | 10/2004 | Noriega et al. |
| 6,807,410 B1 | 10/2004 | Pailles et al. |
| 6,819,219 B1 | 11/2004 | Bolle et al. |
| 6,827,260 B2 | 12/2004 | Stoutenburg et al. |
| 6,829,596 B1 | 12/2004 | Frazee |
| 6,836,765 B1 | 12/2004 | Sussman |
| 6,836,962 B2 | 1/2005 | Khandros et al. |
| 6,839,692 B2 | 1/2005 | Carroll et al. |
| 6,839,744 B1 | 1/2005 | Kloba et al. |
| 6,848,613 B2 | 2/2005 | Nielsen et al. |
| 6,856,974 B1 | 2/2005 | Ganesan et al. |
| 6,868,391 B1 | 3/2005 | Hultgren |
| 6,882,984 B1 | 4/2005 | Boyle et al. |
| 6,915,277 B1 | 7/2005 | Manchester et al. |
| 6,918,537 B2 | 7/2005 | Graves et al. |
| 6,925,439 B1 | 8/2005 | Pitroda |
| 6,932,268 B1 | 8/2005 | McCoy et al. |
| 6,934,529 B2 | 8/2005 | Bagoren et al. |
| 6,934,689 B1 | 8/2005 | Ritter et al. |
| 6,941,270 B1 | 9/2005 | Hannula |
| 6,948,063 B1 | 9/2005 | Ganesan et al. |
| 6,961,412 B2 | 11/2005 | Ruckart et al. |
| 6,965,866 B2 | 11/2005 | Klein |
| 6,975,937 B1 | 12/2005 | Kantarjiev et al. |
| 6,988,657 B1 | 1/2006 | Singer et al. |
| 6,993,510 B2 | 1/2006 | Guy et al. |
| 7,014,107 B2 | 3/2006 | Singer et al. |
| 7,016,863 B1 | 3/2006 | Kamakura et al. |
| 7,024,174 B2 | 4/2006 | Nagy et al. |
| 7,024,396 B2 | 4/2006 | Woodward |
| 7,054,842 B2 | 5/2006 | James et al. |
| 7,069,248 B2 | 6/2006 | Huber |
| 7,072,854 B2 | 7/2006 | Loeser |
| 7,072,864 B2 | 7/2006 | Brake, Jr. et al. |
| 7,083,084 B2 | 8/2006 | Graves et al. |
| 7,085,931 B1 | 8/2006 | Smith et al. |
| 7,086,584 B2 | 8/2006 | Stoutenburg et al. |
| 7,093,761 B2 | 8/2006 | Smith et al. |
| 7,117,227 B2 | 10/2006 | Call |
| 7,128,274 B2 | 10/2006 | Kelley et al. |
| 7,130,817 B2 | 10/2006 | Karas et al. |
| 7,131,582 B2 | 11/2006 | Welton |
| 7,143,055 B1 | 11/2006 | Perkowski |
| 7,162,440 B2 | 1/2007 | Koons |
| 7,165,052 B2 | 1/2007 | Diveley et al. |
| 7,182,252 B1 | 2/2007 | Cooper et al. |
| 7,194,438 B2 | 3/2007 | Sovio et al. |
| 7,209,889 B1 | 4/2007 | Whitfield |
| 7,209,890 B1 | 4/2007 | Peon et al. |
| 7,216,092 B1 | 5/2007 | Weber et al. |
| 7,222,101 B2 | 5/2007 | Bishop et al. |
| 7,229,006 B2 | 6/2007 | Babbi et al. |
| 7,229,014 B1 | 6/2007 | Snyder |
| 7,243,839 B2 | 7/2007 | Beck et al. |
| 7,249,054 B2 | 7/2007 | Keil |
| 7,249,097 B2 | 7/2007 | Hutchison et al. |
| 7,269,256 B2 | 9/2007 | Rosen |
| 7,292,998 B2 | 11/2007 | Graves et al. |
| 7,316,350 B2 | 1/2008 | Algiene |
| 7,328,190 B2 | 2/2008 | Smith et al. |
| 7,333,955 B2 | 2/2008 | Graves et al. |
| 7,356,327 B2 | 4/2008 | Cai et al. |
| 7,363,265 B2 | 4/2008 | Horgan |
| 7,370,012 B2 | 5/2008 | Karns et al. |
| 7,376,431 B2 | 5/2008 | Niedermeyer |
| 7,383,226 B2 | 6/2008 | Kight et al. |
| 7,398,248 B2 | 7/2008 | Phillips et al. |
| 7,400,883 B2 | 7/2008 | Rivers et al. |
| 7,415,617 B2 | 8/2008 | Ginter et al. |
| 7,437,328 B2 | 10/2008 | Graves et al. |
| 7,494,417 B2 | 2/2009 | Walker et al. |
| 7,519,543 B2 | 4/2009 | Ota et al. |
| 7,536,349 B1 | 5/2009 | Mik et al. |
| 7,566,000 B2 | 7/2009 | Agostino et al. |
| 7,590,557 B2 | 9/2009 | Harrison et al. |
| 7,631,803 B2 | 12/2009 | Peyret et al. |
| 7,650,308 B2 | 1/2010 | Nguyen et al. |
| 7,702,542 B2 | 4/2010 | Aslanian, Jr. |
| 7,711,598 B2 | 5/2010 | Perkowski |
| 7,725,326 B1 | 5/2010 | Tracy et al. |
| 7,735,724 B2 | 6/2010 | Fujita et al. |
| 7,757,944 B2 | 7/2010 | Cline et al. |
| 7,774,209 B2 | 8/2010 | James et al. |
| 7,840,437 B2 | 11/2010 | Lewis |
| 7,848,948 B2 | 12/2010 | Perkowski et al. |
| 7,866,548 B2 | 1/2011 | Reed et al. |
| 7,904,333 B1 | 3/2011 | Perkowski |
| 7,905,399 B2 | 3/2011 | Barnes et al. |
| 7,917,386 B2 | 3/2011 | Christensen |
| 7,940,333 B2 | 5/2011 | Suzuki |
| 7,941,373 B1 | 5/2011 | Chang et al. |
| 7,959,076 B1 | 6/2011 | Hopkins, III |
| 8,046,268 B2 | 10/2011 | Hunt |
| 8,060,413 B2 | 11/2011 | Castell et al. |
| 8,103,520 B2 | 1/2012 | Mueller et al. |
| 8,109,436 B1 | 2/2012 | Hopkins, III |
| 8,195,568 B2 | 6/2012 | Singhal |
| 8,332,323 B2 | 12/2012 | Stals et al. |
| 8,355,982 B2 | 1/2013 | Hazel et al. |
| 8,396,758 B2 | 3/2013 | Paradise et al. |
| 8,509,814 B1 | 8/2013 | Parker |
| 8,577,735 B2 | 11/2013 | Wilen et al. |
| 8,636,203 B1 | 1/2014 | Patterson et al. |
| 8,662,387 B1 | 3/2014 | Geller et al. |
| 8,751,298 B1 | 6/2014 | Giordano et al. |
| 8,768,834 B2 | 7/2014 | Zacarias et al. |
| 9,031,869 B2 * | 5/2015 | Glass ............... G06Q 30/0621 |
| | | 705/26.5 |
| 9,098,190 B2 | 8/2015 | Zhou et al. |
| 9,483,786 B2 * | 11/2016 | Glass ............... G06Q 30/0621 |
| 9,672,687 B2 | 6/2017 | Cage et al. |
| 9,785,992 B2 * | 10/2017 | Glass ............... G06Q 30/0621 |
| 9,934,525 B2 * | 4/2018 | Glass ............... G06Q 30/0621 |
| 2001/0001321 A1 | 5/2001 | Resnick et al. |
| 2001/0001856 A1 | 5/2001 | Gould et al. |
| 2001/0005840 A1 | 6/2001 | Verkama |
| 2001/0007983 A1 | 7/2001 | Lee |
| 2001/0011248 A1 | 8/2001 | Himmel et al. |
| 2001/0032878 A1 | 10/2001 | Tsiounis et al. |
| 2001/0034707 A1 | 10/2001 | Sakaguchi |
| 2001/0037264 A1 | 11/2001 | Husemann et al. |
| 2001/0042784 A1 | 11/2001 | Fite et al. |
| 2001/0044776 A1 | 11/2001 | Kight et al. |
| 2001/0056410 A1 | 12/2001 | Ishigaki |
| 2002/0002535 A1 | 1/2002 | Kitchen et al. |
| 2002/0010627 A1 | 1/2002 | Lerat |
| 2002/0010677 A1 | 1/2002 | Kitchen et al. |
| 2002/0013768 A1 | 1/2002 | Ganesan |
| 2002/0019809 A1 | 2/2002 | Kitchen et al. |
| 2002/0022472 A1 | 2/2002 | Watler et al. |
| 2002/0046165 A1 | 4/2002 | Kitchen et al. |
| 2002/0046166 A1 | 4/2002 | Kitchen et al. |
| 2002/0046167 A1 | 4/2002 | Kitchen et al. |
| 2002/0046168 A1 | 4/2002 | Kitchen et al. |
| 2002/0049672 A1 | 4/2002 | Kitchen et al. |
| 2002/0052840 A1 | 5/2002 | Kitchen et al. |
| 2002/0052841 A1 | 5/2002 | Guthrie et al. |
| 2002/0060243 A1 | 5/2002 | Janiak et al. |
| 2002/0062249 A1 | 5/2002 | Iannacci |

(56) References Cited

U.S. PATENT DOCUMENTS

| | | |
|---|---|---|
| 2002/0062282 A1 | 5/2002 | Kight et al. |
| 2002/0065713 A1 | 5/2002 | Awada et al. |
| 2002/0065773 A1 | 5/2002 | Kight et al. |
| 2002/0065774 A1 | 5/2002 | Young et al. |
| 2002/0077076 A1 | 6/2002 | Suryanarayana et al. |
| 2002/0077993 A1 | 6/2002 | Immonen et al. |
| 2002/0088855 A1 | 7/2002 | Hodes |
| 2002/0091573 A1 | 7/2002 | Hodes |
| 2002/0101966 A1 | 8/2002 | Nelson |
| 2002/0107791 A1 | 8/2002 | Nobrega et al. |
| 2002/0111906 A1 | 8/2002 | Garrison et al. |
| 2002/0115424 A1 | 8/2002 | Bagoren et al. |
| 2002/0116329 A1 | 8/2002 | Serbetcioglu et al. |
| 2002/0119767 A1 | 8/2002 | Fieldhouse et al. |
| 2002/0120571 A1 | 8/2002 | Maung et al. |
| 2002/0128968 A1 | 9/2002 | Kitchen et al. |
| 2002/0138450 A1 | 9/2002 | Kremer |
| 2002/0138573 A1 | 9/2002 | Saguy |
| 2002/0152123 A1 | 10/2002 | Giordano et al. |
| 2002/0152160 A1 | 10/2002 | Allen-Rouman et al. |
| 2002/0152179 A1 | 10/2002 | Racov |
| 2002/0153414 A1 | 10/2002 | Stoutenburg et al. |
| 2002/0161631 A1 | 10/2002 | Banerjee et al. |
| 2002/0169713 A1 | 11/2002 | Chang et al. |
| 2002/0178062 A1 | 11/2002 | Wright et al. |
| 2002/0190123 A1 | 12/2002 | Anvekar et al. |
| 2002/0198722 A1 | 12/2002 | Yuschik |
| 2003/0001005 A1 | 1/2003 | Risafi et al. |
| 2003/0004802 A1 | 1/2003 | Callegari |
| 2003/0004891 A1 | 1/2003 | Rensburg et al. |
| 2003/0004894 A1 | 1/2003 | Rowney et al. |
| 2003/0009382 A1 | 1/2003 | D'Arbeloff et al. |
| 2003/0023552 A1 | 1/2003 | Kight et al. |
| 2003/0028481 A1 | 2/2003 | Flitcroft et al. |
| 2003/0033246 A1 | 2/2003 | Slater |
| 2003/0055735 A1 | 3/2003 | Cameron et al. |
| 2003/0055782 A1 | 3/2003 | Slater |
| 2003/0070080 A1 | 4/2003 | Rosen |
| 2003/0074328 A1 | 4/2003 | Schiff et al. |
| 2003/0093366 A1 | 5/2003 | Halper et al. |
| 2003/0105672 A1 | 6/2003 | Epstein et al. |
| 2003/0105688 A1 | 6/2003 | Brown et al. |
| 2003/0115126 A1 | 6/2003 | Pitroda |
| 2003/0121967 A1 | 7/2003 | Goldberg et al. |
| 2003/0126079 A1 | 7/2003 | Roberson et al. |
| 2003/0141358 A1 | 7/2003 | Hudson et al. |
| 2003/0162565 A1 | 8/2003 | Al-Khaja |
| 2003/0163787 A1 | 8/2003 | Hay et al. |
| 2003/0172039 A1 | 9/2003 | Guy et al. |
| 2003/0191711 A1 | 10/2003 | Jamison et al. |
| 2003/0197059 A1 | 10/2003 | Tidball et al. |
| 2003/0200179 A1 | 10/2003 | Kwan |
| 2003/0200184 A1 | 10/2003 | Dominguez et al. |
| 2003/0212601 A1 | 11/2003 | Silva et al. |
| 2003/0218062 A1 | 11/2003 | Noriega et al. |
| 2003/0218066 A1 | 11/2003 | Fernandes et al. |
| 2003/0220884 A1 | 11/2003 | Choi et al. |
| 2003/0226042 A1 | 12/2003 | Fukushima |
| 2003/0229590 A1 | 12/2003 | Byrne et al. |
| 2003/0233317 A1 | 12/2003 | Judd |
| 2003/0233318 A1 | 12/2003 | King et al. |
| 2003/0234819 A1 | 12/2003 | Daly et al. |
| 2003/0236704 A1 | 12/2003 | Antonucci |
| 2004/0009760 A1 | 1/2004 | Laybourn et al. |
| 2004/0010462 A1 | 1/2004 | Moon et al. |
| 2004/0019564 A1 | 1/2004 | Goldthwaite et al. |
| 2004/0019568 A1 | 1/2004 | Moenickheim et al. |
| 2004/0029569 A1 | 2/2004 | Khan et al. |
| 2004/0046035 A1 | 3/2004 | Davila et al. |
| 2004/0049456 A1 | 3/2004 | Dreyer |
| 2004/0049458 A1 | 3/2004 | Kunugi et al. |
| 2004/0054587 A1 | 3/2004 | Dev et al. |
| 2004/0059671 A1 | 3/2004 | Nozaki et al. |
| 2004/0064409 A1 | 4/2004 | Kight et al. |
| 2004/0068446 A1 | 4/2004 | Do et al. |
| 2004/0068448 A1 | 4/2004 | Kim |
| 2004/0078327 A1 | 4/2004 | Frazier et al. |
| 2004/0078332 A1 | 4/2004 | Ferguson et al. |
| 2004/0083170 A1 | 4/2004 | Bam et al. |
| 2004/0083171 A1 | 4/2004 | Kight et al. |
| 2004/0093305 A1 | 5/2004 | Kight et al. |
| 2004/0094624 A1 | 5/2004 | Fernandes et al. |
| 2004/0107170 A1 | 6/2004 | Labrou et al. |
| 2004/0114766 A1 | 6/2004 | Hileman et al. |
| 2004/0117302 A1 | 6/2004 | Weichert et al. |
| 2004/0118914 A1 | 6/2004 | Smith et al. |
| 2004/0128197 A1 | 7/2004 | Bam et al. |
| 2004/0139005 A1 | 7/2004 | Ganesan |
| 2004/0159700 A1 | 8/2004 | Khan et al. |
| 2004/0162058 A1 | 8/2004 | Mottes |
| 2004/0167853 A1 | 8/2004 | Sharma |
| 2004/0181463 A1 | 9/2004 | Goldthwaite et al. |
| 2004/0185881 A1 | 9/2004 | Lee et al. |
| 2004/0199431 A1 | 10/2004 | Ganesan et al. |
| 2004/0199474 A1 | 10/2004 | Ritter |
| 2004/0205023 A1 | 10/2004 | Hafer et al. |
| 2004/0205138 A1 | 10/2004 | Friedman et al. |
| 2004/0210449 A1 | 10/2004 | Breck et al. |
| 2004/0215560 A1 | 10/2004 | Amalraj et al. |
| 2004/0215564 A1 | 10/2004 | Lawlor et al. |
| 2004/0215573 A1 | 10/2004 | Teutenberg et al. |
| 2004/0224660 A1 | 11/2004 | Anderson |
| 2004/0225560 A1 | 11/2004 | Lewis et al. |
| 2004/0230489 A1 | 11/2004 | Goldthwaite et al. |
| 2004/0232225 A1 | 11/2004 | Bishop et al. |
| 2004/0242208 A1 | 12/2004 | Teicher |
| 2004/0243490 A1 | 12/2004 | Murto et al. |
| 2004/0249710 A1 | 12/2004 | Smith et al. |
| 2004/0249766 A1 | 12/2004 | Ganesan et al. |
| 2004/0267663 A1 | 12/2004 | Karns et al. |
| 2004/0267664 A1 | 12/2004 | Nam et al. |
| 2004/0267665 A1 | 12/2004 | Nam et al. |
| 2005/0001027 A1 | 1/2005 | Bahar |
| 2005/0015388 A1 | 1/2005 | Dasgupta et al. |
| 2005/0021457 A1 | 1/2005 | Johnson et al. |
| 2005/0027624 A1 | 2/2005 | Cai |
| 2005/0027655 A1 | 2/2005 | Sharma et al. |
| 2005/0033645 A1 | 2/2005 | DuPhily |
| 2005/0051619 A1 | 3/2005 | Graves et al. |
| 2005/0060261 A1 | 3/2005 | Remington et al. |
| 2005/0061872 A1 | 3/2005 | Paschini et al. |
| 2005/0065876 A1 | 3/2005 | Kumar |
| 2005/0071179 A1 | 3/2005 | Peters et al. |
| 2005/0071269 A1 | 3/2005 | Peters |
| 2005/0075958 A1 | 4/2005 | Gonzalez |
| 2005/0075975 A1 | 4/2005 | Rosner et al. |
| 2005/0079863 A1 | 4/2005 | Macaluso |
| 2005/0080634 A1 | 4/2005 | Kanniainen et al. |
| 2005/0080727 A1 | 4/2005 | Postrel |
| 2005/0086164 A1 | 4/2005 | Kim et al. |
| 2005/0086168 A1 | 4/2005 | Alvarez et al. |
| 2005/0096981 A1 | 5/2005 | Shimada |
| 2005/0097038 A1 | 5/2005 | Yu et al. |
| 2005/0103839 A1 | 5/2005 | Hewel |
| 2005/0107068 A1 | 5/2005 | Smith et al. |
| 2005/0109835 A1 | 5/2005 | Jacoby et al. |
| 2005/0116028 A1 | 6/2005 | Cohen et al. |
| 2005/0125343 A1 | 6/2005 | Mendelovich |
| 2005/0125348 A1 | 6/2005 | Fulton et al. |
| 2005/0127169 A1 | 6/2005 | Foss |
| 2005/0137978 A1 | 6/2005 | Ganesan et al. |
| 2005/0143051 A1 | 6/2005 | Park |
| 2005/0154644 A1 | 7/2005 | Deakin et al. |
| 2005/0174975 A1 | 8/2005 | Mgrdechian et al. |
| 2005/0177437 A1 | 8/2005 | Ferrier |
| 2005/0177517 A1 | 8/2005 | Leung et al. |
| 2005/0182714 A1 | 8/2005 | Nel |
| 2005/0182720 A1 | 8/2005 | Willard et al. |
| 2005/0184145 A1 | 8/2005 | Law et al. |
| 2005/0187873 A1 | 8/2005 | Labrou et al. |
| 2005/0199709 A1 | 9/2005 | Linlor |
| 2005/0203835 A1 | 9/2005 | Nhaissi et al. |
| 2005/0203844 A1 | 9/2005 | Ferguson et al. |
| 2005/0209965 A1 | 9/2005 | Ganesan |

(56) References Cited

U.S. PATENT DOCUMENTS

| | | |
|---|---|---|
| 2005/0222925 A1 | 10/2005 | Jamieson |
| 2005/0222961 A1 | 10/2005 | Staib et al. |
| 2005/0228717 A1 | 10/2005 | Gusler et al. |
| 2005/0247777 A1 | 11/2005 | Pitroda |
| 2005/0259589 A1 | 11/2005 | Rozmovits et al. |
| 2005/0261968 A1 | 11/2005 | Randall et al. |
| 2005/0262017 A1 | 11/2005 | Kawase et al. |
| 2005/0269401 A1 | 12/2005 | Spitzer et al. |
| 2005/0269402 A1 | 12/2005 | Spitzer et al. |
| 2005/0274793 A1 | 12/2005 | Cantini et al. |
| 2006/0000900 A1 | 1/2006 | Fernandes et al. |
| 2006/0004631 A1 | 1/2006 | Roberts et al. |
| 2006/0004656 A1 | 1/2006 | Lee |
| 2006/0006226 A1 | 1/2006 | Fitzgerald et al. |
| 2006/0023856 A1 | 2/2006 | Welton |
| 2006/0026070 A1 | 2/2006 | Sun |
| 2006/0037835 A1 | 2/2006 | Doran et al. |
| 2006/0041470 A1 | 2/2006 | Filho et al. |
| 2006/0053056 A1 | 3/2006 | Alspach-Goss et al. |
| 2006/0058011 A1 | 3/2006 | Vanska et al. |
| 2006/0074767 A1 | 4/2006 | Fortney et al. |
| 2006/0080232 A1 | 4/2006 | Epps |
| 2006/0085310 A1 | 4/2006 | Mylet et al. |
| 2006/0089160 A1 | 4/2006 | Othmer |
| 2006/0089893 A1 | 4/2006 | Joseph et al. |
| 2006/0113376 A1 | 6/2006 | Reed et al. |
| 2006/0116892 A1 | 6/2006 | Grimes et al. |
| 2006/0136334 A1 | 6/2006 | Atkinson et al. |
| 2006/0136901 A1 | 6/2006 | Nichols |
| 2006/0161490 A1 | 7/2006 | Chakiris et al. |
| 2006/0163343 A1 | 7/2006 | Changryeol |
| 2006/0167744 A1 | 7/2006 | Yoo |
| 2006/0206436 A1 | 9/2006 | James et al. |
| 2006/0207856 A1 | 9/2006 | Dean et al. |
| 2006/0235754 A1 | 10/2006 | Walker et al. |
| 2006/0253320 A1 | 11/2006 | Heywood |
| 2006/0255125 A1 | 11/2006 | Jennings et al. |
| 2007/0017976 A1 | 1/2007 | Peyret et al. |
| 2007/0021969 A1 | 1/2007 | Homeier-Beals |
| 2007/0030824 A1 | 2/2007 | Ribaudo et al. |
| 2007/0038577 A1 | 2/2007 | Werner et al. |
| 2007/0043682 A1 | 2/2007 | Drapkin et al. |
| 2007/0055785 A1 | 3/2007 | Stevens |
| 2007/0063024 A1 | 3/2007 | Guillot |
| 2007/0100761 A1 | 5/2007 | Dillon |
| 2007/0108269 A1 | 5/2007 | Benco et al. |
| 2007/0114274 A1 | 5/2007 | Gibbs et al. |
| 2007/0118478 A1 | 5/2007 | Graves et al. |
| 2007/0125838 A1 | 6/2007 | Law et al. |
| 2007/0130085 A1 | 6/2007 | Zhu |
| 2007/0156436 A1 | 7/2007 | Fisher et al. |
| 2007/0162337 A1 | 7/2007 | Hawkins et al. |
| 2007/0175984 A1 | 8/2007 | Khandaker et al. |
| 2007/0192182 A1 | 8/2007 | Monaco et al. |
| 2007/0198347 A1 | 8/2007 | Muldoon |
| 2007/0208618 A1 | 9/2007 | Paintin et al. |
| 2007/0220054 A1* | 9/2007 | Hunter .................. G06Q 30/02 |
| 2007/0233615 A1 | 10/2007 | Tumminaro |
| 2007/0257767 A1 | 11/2007 | Beeson |
| 2007/0262140 A1 | 11/2007 | Long |
| 2007/0265872 A1 | 11/2007 | Robinson et al. |
| 2007/0284434 A1 | 12/2007 | Fletcher |
| 2008/0006685 A1 | 1/2008 | Rackley, III et al. |
| 2008/0010190 A1 | 1/2008 | Rackley, III et al. |
| 2008/0010191 A1 | 1/2008 | Rackley, III et al. |
| 2008/0010192 A1 | 1/2008 | Rackley, III et al. |
| 2008/0010193 A1 | 1/2008 | Rackley, III et al. |
| 2008/0010196 A1 | 1/2008 | Rackley, III et al. |
| 2008/0010204 A1 | 1/2008 | Rackley, III et al. |
| 2008/0010215 A1 | 1/2008 | Rackley, III et al. |
| 2008/0028395 A1 | 1/2008 | Motta et al. |
| 2008/0033817 A1 | 2/2008 | Billmaier et al. |
| 2008/0040265 A1 | 2/2008 | Rackley, III et al. |
| 2008/0041938 A1 | 2/2008 | Wise |
| 2008/0046366 A1 | 2/2008 | Bemmel et al. |
| 2008/0052164 A1 | 2/2008 | Abifaker |
| 2008/0052169 A1 | 2/2008 | O'Shea et al. |
| 2008/0059318 A1 | 3/2008 | Packes et al. |
| 2008/0070690 A1 | 3/2008 | Luchene et al. |
| 2008/0071620 A1 | 3/2008 | Lowe |
| 2008/0078831 A1 | 4/2008 | Johnson et al. |
| 2008/0091545 A1 | 4/2008 | Jennings et al. |
| 2008/0097844 A1 | 4/2008 | Hsu et al. |
| 2008/0097851 A1 | 4/2008 | Bemmel et al. |
| 2008/0103972 A1 | 5/2008 | Lanc |
| 2008/0114699 A1 | 5/2008 | Yuan et al. |
| 2008/0126145 A1 | 5/2008 | Rackley, III et al. |
| 2008/0133351 A1 | 6/2008 | White et al. |
| 2008/0172306 A1 | 7/2008 | Schorr et al. |
| 2008/0172331 A1 | 7/2008 | Graves et al. |
| 2008/0179395 A1 | 7/2008 | Dixon et al. |
| 2008/0189368 A1* | 8/2008 | Rothschild .............. B07C 3/00 709/205 |
| 2008/0228597 A1 | 9/2008 | Sondles |
| 2008/0235095 A1 | 9/2008 | Oles et al. |
| 2008/0255942 A1 | 10/2008 | Craft |
| 2008/0273630 A1 | 11/2008 | Mege et al. |
| 2008/0290987 A1 | 11/2008 | Li |
| 2008/0319868 A1* | 12/2008 | Briscoe ............ G06Q 30/0601 705/26.1 |
| 2009/0001159 A1 | 1/2009 | James et al. |
| 2009/0006116 A1 | 1/2009 | Baker et al. |
| 2009/0030789 A1 | 1/2009 | Mashinsky |
| 2009/0037326 A1 | 2/2009 | Chitti et al. |
| 2009/0055296 A1 | 2/2009 | Nelsen |
| 2009/0076896 A1 | 3/2009 | DeWitt et al. |
| 2009/0106115 A1 | 4/2009 | James et al. |
| 2009/0111378 A1 | 4/2009 | Sheynman et al. |
| 2009/0112709 A1 | 4/2009 | Barhydt et al. |
| 2009/0144161 A1 | 6/2009 | Fisher |
| 2009/0157554 A1 | 6/2009 | Hobson et al. |
| 2009/0164329 A1 | 6/2009 | Bishop et al. |
| 2009/0171739 A1 | 7/2009 | De et al. |
| 2009/0171804 A1 | 7/2009 | Lee et al. |
| 2009/0173782 A1 | 7/2009 | Muscato |
| 2009/0173784 A1 | 7/2009 | Yang |
| 2009/0187491 A1 | 7/2009 | Bull et al. |
| 2009/0192904 A1 | 7/2009 | Patterson et al. |
| 2009/0192928 A1 | 7/2009 | Abifaker |
| 2009/0247131 A1 | 10/2009 | Champion et al. |
| 2009/0254453 A1 | 10/2009 | Sanguinetti et al. |
| 2009/0281915 A1 | 11/2009 | Deakin et al. |
| 2009/0281941 A1 | 11/2009 | Worth |
| 2009/0281951 A1 | 11/2009 | Shakkarwar |
| 2009/0287558 A1 | 11/2009 | Seth et al. |
| 2009/0298427 A1 | 12/2009 | Wilkinson et al. |
| 2009/0327121 A1 | 12/2009 | Carroll et al. |
| 2010/0005025 A1 | 1/2010 | Kumar et al. |
| 2010/0008535 A1 | 1/2010 | Abulafia et al. |
| 2010/0010906 A1 | 1/2010 | Grecia |
| 2010/0017278 A1* | 1/2010 | Wilen ............... G06Q 30/0254 705/14.2 |
| 2010/0041368 A1 | 2/2010 | Kumar |
| 2010/0042471 A1 | 2/2010 | Chang et al. |
| 2010/0063906 A1 | 3/2010 | Nelsen et al. |
| 2010/0076833 A1 | 3/2010 | Nelsen |
| 2010/0082487 A1 | 4/2010 | Nelsen |
| 2010/0082490 A1 | 4/2010 | Rosenblatt et al. |
| 2010/0088188 A1 | 4/2010 | Kumar et al. |
| 2010/0097180 A1 | 4/2010 | Cardullo |
| 2010/0130172 A1 | 5/2010 | Vendrow et al. |
| 2010/0131415 A1 | 5/2010 | Sartipi |
| 2010/0174993 A1 | 7/2010 | Pennington et al. |
| 2010/0175287 A1 | 7/2010 | Gupta et al. |
| 2010/0185505 A1 | 7/2010 | Sprogoe et al. |
| 2010/0205063 A1 | 8/2010 | Mersky |
| 2010/0280921 A1 | 11/2010 | Stone et al. |
| 2010/0293536 A1 | 11/2010 | Nikitin et al. |
| 2010/0299194 A1 | 11/2010 | Snyder et al. |
| 2010/0299266 A1 | 11/2010 | Catania et al. |
| 2010/0304852 A1 | 12/2010 | Szrek et al. |
| 2011/0087592 A1 | 4/2011 | Veen et al. |
| 2011/0091092 A1 | 4/2011 | Nepomniachtchi et al. |
| 2011/0106698 A1 | 5/2011 | Isaacson et al. |

(56) References Cited

U.S. PATENT DOCUMENTS

| | | |
|---|---|---|
| 2011/0125607 A1 | 5/2011 | Wilen |
| 2011/0145044 A1 | 6/2011 | Nelsen et al. |
| 2011/0161226 A1 | 6/2011 | Courtion et al. |
| 2011/0173083 A1 | 7/2011 | Reed et al. |
| 2011/0202419 A1 | 8/2011 | Mamdani et al. |
| 2011/0234514 A1 | 9/2011 | Gothard |
| 2011/0246284 A1 | 10/2011 | Chaikin et al. |
| 2011/0251962 A1 | 10/2011 | Hruska |
| 2012/0004769 A1 | 1/2012 | Hallenbeck et al. |
| 2012/0099780 A1 | 4/2012 | Smith et al. |
| 2012/0136780 A1 | 5/2012 | El-Awady et al. |
| 2012/0203572 A1 | 8/2012 | Christensen |
| 2012/0209688 A1 | 8/2012 | Lamothe et al. |
| 2012/0234911 A1 | 9/2012 | Yankovich et al. |
| 2012/0271689 A1 | 10/2012 | Etheredge et al. |
| 2012/0284185 A1 | 11/2012 | Mettler et al. |
| 2013/0073388 A1 | 3/2013 | Heath |
| 2013/0132169 A1* | 5/2013 | Dooley ............ G06Q 30/00 705/14.1 |
| 2013/0290121 A1 | 10/2013 | Simakov et al. |
| 2013/0304561 A1 | 11/2013 | Warner et al. |
| 2014/0006268 A1 | 1/2014 | Roberts et al. |
| 2014/0019238 A1 | 1/2014 | Blatchley et al. |
| 2015/0278845 A1 | 10/2015 | Sorem et al. |
| 2017/0076293 A1 | 3/2017 | Cage et al. |

FOREIGN PATENT DOCUMENTS

| | | |
|---|---|---|
| EP | 2128809 A1 | 12/2009 |
| JP | 2002189963 A | 7/2002 |
| JP | 2002318951 A | 10/2002 |
| JP | 2003208541 A | 7/2003 |
| KR | 20010106187 A | 11/2001 |
| KR | 20040028487 A | 4/2004 |
| KR | 20040052531 A | 6/2004 |
| KR | 1020040052502 A | 6/2004 |
| KR | 20040069294 A | 8/2004 |
| KR | 20050118609 A | 12/2005 |
| KR | 20090123444 A | 12/2009 |
| WO | 2004012118 A1 | 2/2004 |
| WO | 2005111882 A1 | 11/2005 |
| WO | 2008005018 A9 | 1/2010 |
| WO | 2013078499 A1 | 6/2013 |

OTHER PUBLICATIONS

International Search Report of PCT/US 13/23945, dated Mar. 29, 2013; 2 pages.
ISA European Patent Office, Search Report of EP09812328.4, dated Jul. 4, 2012, Germany, 6 pages.
ISA Korea, International Search Report of PCT/US2009/056118, dated Apr. 19, 2010, 3 pages.
ISA Korea, International Search Report of PCT/US2009/058111, dated May 26, 2010, 3 pages.
ISA Korean Intellectual Property Office, International Search Report of PCT/US2010/060875, dated Jul. 29, 2011, 10 pages.
ISA United States Patent and Trademark Office, International Search Report of PCT/US2008/073910, dated Nov. 10, 2008.
Nelsen, David A., "Systems and Methods to Manage and Control Use of a Virtual Card," U.S. Appl. No. 13/158,349, filed Jun. 10, 2011, 62 pages.

* cited by examiner

Fig. 1

Personalized Gift Card Holder Process Flow

Fig. 2

Video Gift Card Holder Process Flow

Fig. 3

Video Teaser Process Flow

ONLINE PERSONALIZED GIFTING SYSTEM

RELATED APPLICATION

This application is a continuation of U.S. patent application Ser. No. 14/682,405, filed Apr. 9, 2015, which is a divisional of U.S. patent application Ser. No. 13/273,220, filed Oct. 13, 2011, now U.S. Pat. No. 9,031,869, which claims benefit of U.S. Patent Application 61/392,933, filed Oct. 13, 2010. The contents of the above-referenced patent applications are hereby incorporated by reference.

BACKGROUND OF THE INVENTION

This invention relates generally to gift cards and more particularly to a system for improving the overall giftability of gift cards by providing means for users to add numerous personalization options to physical gift card holders as well as the personalization of other digital communications mediums to communicate a sentiment, occasion, message, and/or gift card brand experience. A system according to the invention may include the creation and transmission of a personalized, introductory video to the intended gift card recipient prior to delivery and receipt of the physical gift card.

Transaction cards, stored value cards, or gift cards as they are commonly called based upon their intended use, have become popular gifts. Gift cards typically comprise a stored value card whereby a certain cash equivalent value is encoded upon a magnet strip applied to the surface of the card. This stored value may be determined by the vendor prior to packaging and display for sale or, more commonly, is selected at the point of sale by the purchaser and loaded by the cashier using a magnet card reader/writer.

Holders for gift cards have been used both to simply store gift cards and to provide a surface for decorative indicia and graphics, as well as personalized or preprinted text. Gift card holders that provide user initiated sound are also known, as disclosed in U.S. patent application Ser. No. 13/273,220. Needed is a system that provides for personalization of gift card holders via an online, interactive ordering platform, whereby a user may select from content provided by the system as well as upload personalized content for inclusion in the production of the holder and may personalize an introductory video for delivery to the gift recipient to enhance anticipation and excitement regarding the impending receipt of the holder and an accompanying gift card.

BRIEF DESCRIPTION OF THE INVENTION

The purpose of this invention is to provide a means for a user of the system, typically a gift giver, to personalize and customize a gift comprising a gift card. Among other functions and features, an online personalization system delivers a plurality of gift card related packaging formats intended to improve the giftability of online gift card sales. Three formats disclosed herein include:

1. A personalized, greeting card-style format that allows the user to upload a photograph, customize the greeting, customize a text message, and add sound such as music or a recorded voice message. Currently, these types of personalization options are offered primarily as it relates to social expressions, i.e. greeting cards, as opposed to gift cards.

2. A video card holder format that allows the user to upload their own personal video file which is then downloaded onto the video card holder via USB download, wireless radio signal, or other means, thus allowing the recipient to initiate playback upon receipt of the gift card and holder.

3. A video teaser comprising a video file (typically approximately 30-90 seconds in duration but which may be of any operable length) which can be personalized by uploading the gift card recipient's photo into the video as well as adding text content to certain customizable text fields, such as recipients name, occasion, or sentiment. The video teaser is provided to the recipient in some embodiments prior to their receipt of the gift card and can be provided via an email or QR code containing a link to a webpage where the video teaser may be viewed. The video teaser is provided in order to create excitement, anticipation, and imagination of the possibilities of a special gift arriving soon, thus extending the gifting experience to multiple days. Additionally the video teasers may be used to communicate a sentiment, occasion, and or gift card brand experience once the gift card has been received.

A method of generating a personalized gift card holder according to an embodiment of the invention may include the steps of providing a system and system interface, providing one or more gift card types, providing a user a choice of selecting one or more of the gift card types, providing one or more gift card holder designs, providing a user a choice of selecting one or more of the gift card holder designs, providing a user a choice of selecting a first sound file (such as a music recording) provided on the system or of uploading a second sound file (such as a voice message) to the system, providing a user means for uploading an image file (such as a photograph or logo or other graphic) to the system, providing a user means for uploading a video file to the system, providing a user means for submitting text to the system, transmitting user gift card, gift holder and sound file selections to a production facility, storing user-provided image files, text, and sound files on computer readable memory, attaching the memory to a card holder, attaching a transaction card to the card holder, providing a video relating to the gift card to the recipient, delivering the holder to a recipient.

Other advantages of the invention will become apparent from the following description taken in connection with the accompanying drawings, wherein is set forth by way of illustration and example an embodiment of the present invention.

DETAILED DESCRIPTION

As required, a detailed embodiment of the present invention is disclosed herein; however, it is to be understood that the disclosed embodiment is merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
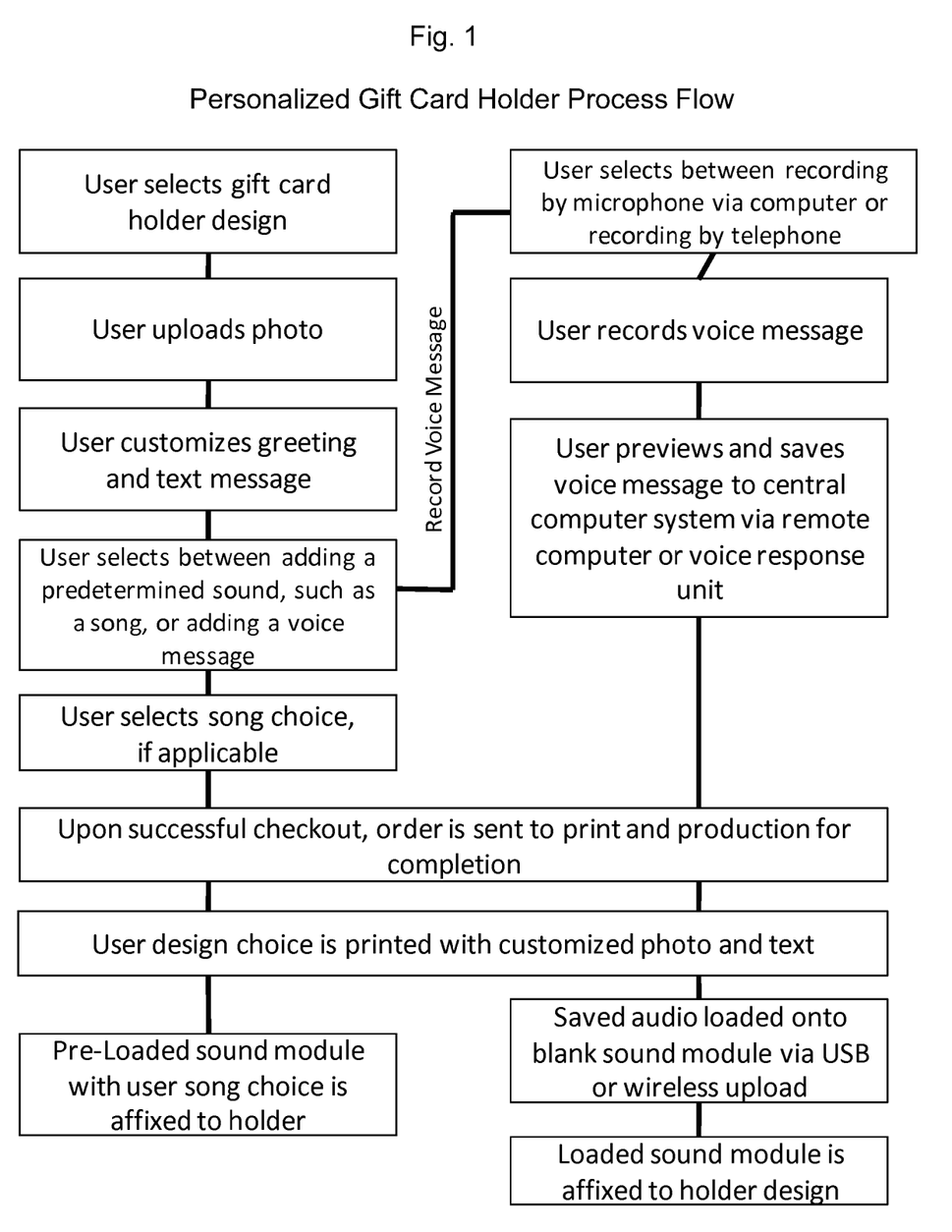
FIG. 1 is a chart showing steps of a Personalized Gift Card Holder Process Flow.
Figure 2:
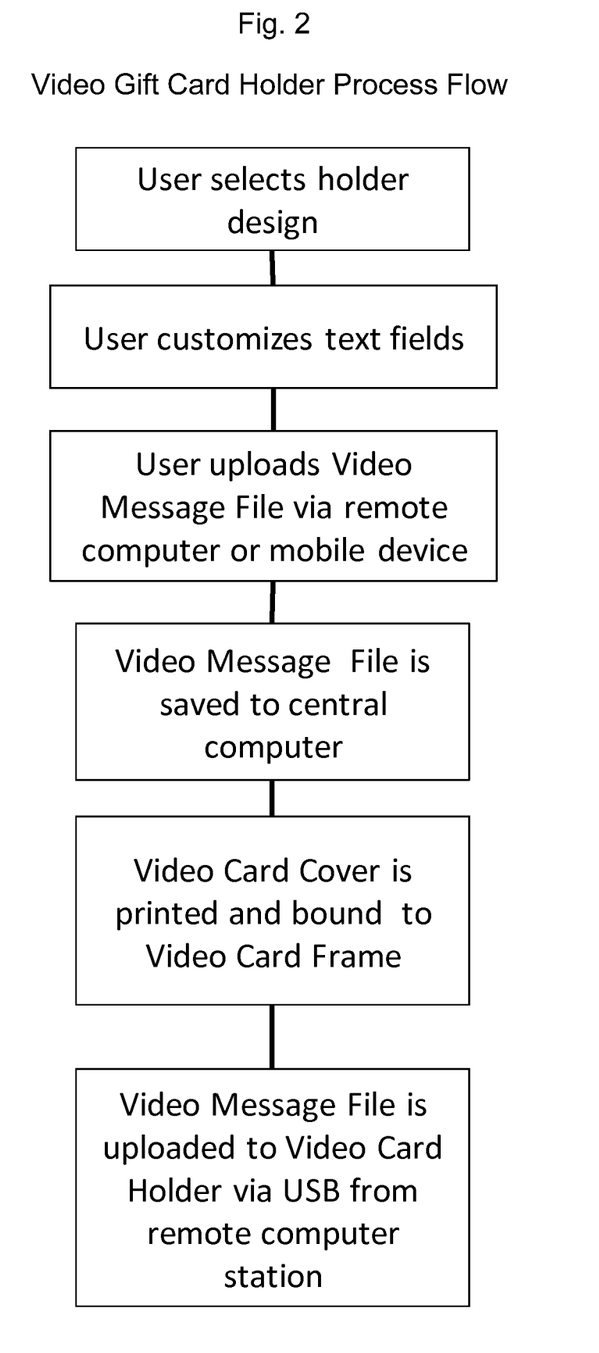
FIG. 2 is a chart showing steps of a Video Gift Card Holder Process Flow.
Figure 3:
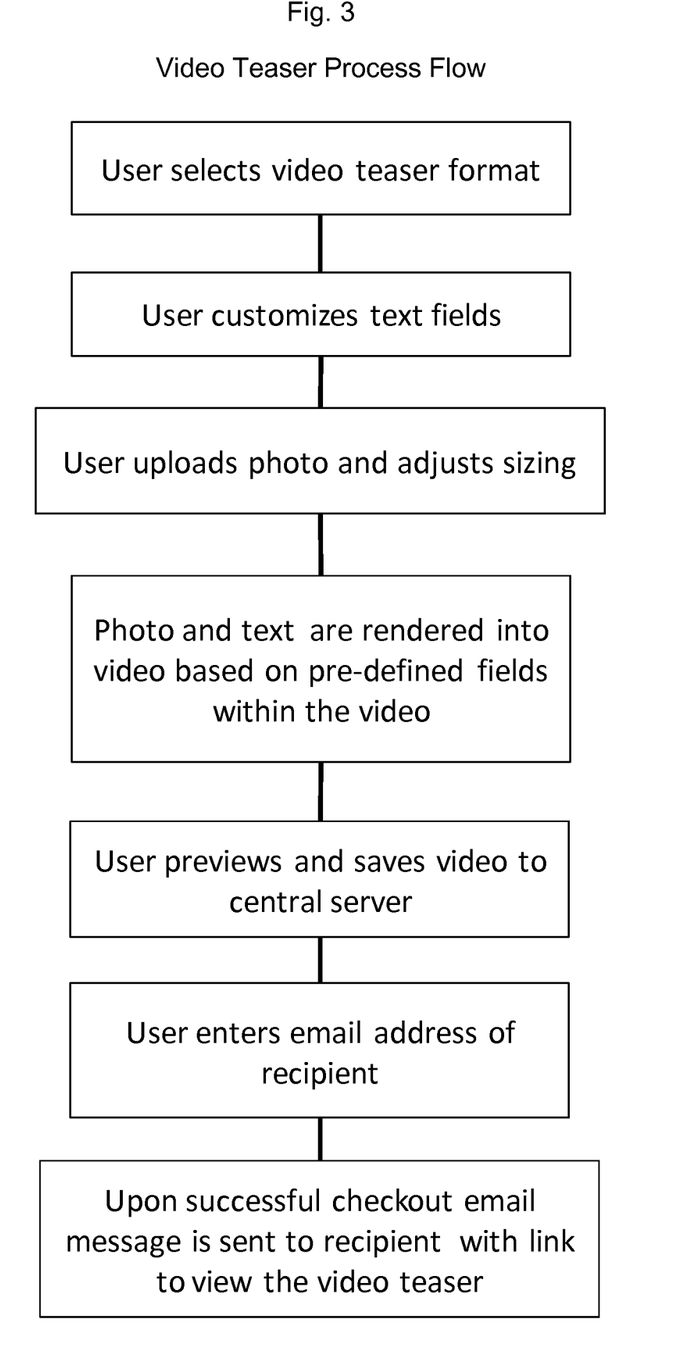
FIG. 3 is a chart showing steps of a Video Teaser Process Flow.

Referring now to FIGS. 1 through 3, there are shown embodiments of online personalized gifting platforms and gift packaging formats intended to improve the giftability of online gift card sales. Three formats include a system for providing a personalized gift card holder including, for example, a voice message, a video card holder including, for example, a personal video, and a personalized digital video teaser.

A gift card holder in accordance with a personalized greeting card format allows the user to upload a photo, customize a greeting, customize a text message, add pre-recording songs and/or record a sound or voice message. An online personalized gifting system including a gift card and gift card holder is typically accessed by the user via a user interface displayed on a personal computer (PC), smartphone, tablet or other personal computing device. The user interface, also referred to herein as the system interface, is typically a web page created using HTML, XML, XHTML, Javascript®, Java® or equivalent programming languages or scripts as generally known in the field. A user may arrive at the system interface via an html link provided on a third party website, such as a third party website offering gift cards or other goods or services, or by directly accessing a system provider website, or by mobile application via smart phone or tablet device.

The user typically initiates an online personalized gifting transaction by searching for specific gift cards via occasion, category (such as dining, spa, hotel, shopping, or event), brand, and/or recipient (such as him, her, teens, kids, babies) associated with gift cards. The user can also filter by geographic location, typically city and state, or zip code or by accessing the web-site directly. The user then selects a gift card corresponding to a particular offer. Typically, an offer will comprise a particular business entity or venue and may be, for example, a restaurant, hotel, theater, store, or shopping district. In some embodiments, the user may also select particular design graphics or indicia to appear on the gift card. The user then selects a gift card denomination or enters a desired denomination amount to load or associate with the gift card. In certain embodiments the user may search by experience and thus select multiple brands available via a single gift card (such as dinner and a movie) or a gift card that is pre-denominated.

Next, the user is presented an option to select from various gift card packaging options including but not limited to personalized and customized audio (not all options include audio, with some selections offered, the user selects a holder and customizes text and/or video) gift card holder, a pre-designed decorative gift card holder, a video gift card holder and a video teaser. With each of the packaging options the user is presented with the specific features and design previews in order make a choice.

After selecting a customizable audio gift card holder, the user is directed to a series of user interface web pages whereby various selections may be made and various items of personal information such as customizable greetings, sentiments, or occasions along with adding a personal message, photo, sound or voice message may be provided to the system for the system to use in creating the personalized and customized audio gift card holder. Initially, the user selects from among several gift card holder designs. Each design typically presents alternatives as to color choice, disposition of graphical elements and text upon the body of the holder and, in some cases, number and type of customizable elements.

As the user scrolls through design choices, text and icons on the web page indicate what each design offers as to appearance and functionality (e.g. upload photo or logo, enter text, select or record audio). In the present exemplary embodiment, the user interface indicates that the selected holder includes a designated area for printing a photo or logo provided by the user, one or more designated areas for printing personalized text provided by the user, and an audio circuit for playing sound.

The user follows a serious of instructions wherein the user is asked to select an existing sound file or to record their own message. In the case of an existing sound file, the user selects the desired song from among the choices presented by the system. If the user prefers to record their own message, they will be given the choice to record the message using the microphone on their computer or, they can record the message via a dial-in number where the user will be instructed via prompts how to record and save the message. The user will then be provided the opportunity to review the recorded message via the web-site before finalizing the selection. Once the selection of the sound file (pre-existing or provided by the user) is confirmed by the user, the sound file is sent to a computer located in a fulfillment center or, alternatively, the sound file may be sent to a computer storage facility that is connected via the Internet to a fulfillment center. That sound file is matched to the consumer's order and then burned on to an IC/OTP chip (via cable circuitry to the programmer or to the programmer via wireless connectivity). The IC/OTP chip is then placed in a sound module and then into the gift card holder that that user has selected. Chips may be burned one at a time or in multiple batches at a time.

After selecting the base gift card holder design, the user is provided with the opportunity to upload a photo. To initiate upload, a button or other link is typically selected by the user to access a local file directory showing a directory structure on the user's PC. The user selects the appropriate directory and then selects a photo image file on the PC for upload to the system. It should be appreciated that the user may thus access an image file physically stored on a hard drive or other storage media of the user's PC or may use the PC to access an external hard drive or server connected or in communication with the PC including image files accessed via Internet connect from a remote storage location. The photo file is typically accessed from a third party, external, social media or photo-sharing site (such as Facebook, Flickr, Snapfish, etc.) and is made available via API interface provided by such third party site where the photo files are located.

After the image file associated with the selected photo is uploaded to the system, the photo appears framed within a virtual image of a gift card holder on a system webpage or pop-up window so that the user may assess approximately how the photo will appear when printed on a gift card holder. Various controls are provided on the webpage to rotate the image and alter or adjust tone and size. Controls to move the image relative to the constraints of a display space provided on the gift card holder are also provided to allow the user to, for example, center a selected portion of the photo within the display space. A control to allow the user to crop the photo may also be provided.

After the user approves the photo and selected photo parameters or adjustments, typically by selecting a save or continue function, the system provides a web page or pop-up window for the user to select and enter a greeting and message that will each be printed and displayed upon the gift card holder. A drop down menu or equivalent function provides a list of pre-constructed greetings, each usually associated with particular holiday, event or sentiment. After selecting a greeting, the user may enter any desired text message within a text entry box. Instructions may be provided alerting the user to word or character limits. The interface may provide means for selecting text message font, size, and/or color, or these parameters may already be determined and may be pre-selected or determined according aspects of the selected card design such as color or theme. The system also provides an interface to for the user to upload a logo in designated areas.

If not already offered the opportunity to select and/or provide audio, as described above, the user next selects between adding prerecorded audio, such as a pre-recorded message or song, or recording a voice message or other audio using a computer microphone or telephone. If the user selects the option to add prerecorded audio, the user selects a song or other audio clip from a set of choices provided, typically via drop down menu. Alternatively, a menu of occasion themes may be provided such that the audio clip selection is determined and populated according to the selected theme.

If the user selects the option to record a message or other audio, the system provides an interface for receiving and recording a voice message or other audio signal provided by the user. The interface web page (typically a pop-up window, iFrame or similar web interface) may include a series of prompts or instructions that provide tips for best recording, a button or link to begin recording audio, a sliding bar or other indicator such as a counter that shows time elapsed or remaining until a recording time limit is exceeded, a preview or playback button or link to allow the user to listen to the recording, and a save or continue button or link to save the recording within the system.

The user may select among choices provided by the interface such as selecting between options to record by computer microphone or to record by telephone. If the option to record by computer microphone is selected, the user may record any sound, typically a voice message, using the computer microphone, and the recorded audio is uploaded to the provider server or other storage medium. Alternatively, the system may provide an option to upload a prerecorded audio file such as an audio file stored in mp3 or way format.

If the option to record by telephone is selected, the system provides a telephone number for the user to call to record any sound, typically a voice message, and the recorded audio is stored by the provider server.

After audio is recorded by the user using either method, the system provides an option to listen to the recording. The user may then approve the recording for use or rerecord another audio segment. Review of recorded audio may occur via the user computer or via telephone voice response unit. Once approved, the audio recording is saved as an mp3 file or other operable format (e.g. way).

The audio file may remain stored on the initial server or storage device utilized during audio recording by the provider or may be transferred to a production site server or storage device. As a further alternative, the recordation and storage of audio files may be handled by a third party service provider operating in cooperation with the system provider.

After the user completes the transaction, which typically includes providing payment information, the system generates an order corresponding to the user selections and the order is transmitted to a printing and production service for producing a gift card holder bearing personalized printing and including a personalized audio recording. The design selected by the user is printed on the holder along with any photograph or text provided or selected by the user. If a pre-recorded sound, such as a song, was selected by the user, a pre-recorded sound module having the selected sound recorded thereon is affixed to, or more typically within, the holder. If audio was recorded by the user it is loaded onto a blank sound module via USB or wireless file transfer, or other operable means, at a system production facility. The loaded sound module is then affixed to, or more typically within, the holder. A gift card or other transaction card is attached to or within the holder, or otherwise bundled with the holder, and the holder is conveyed to the recipient via US mail or other mail delivery service.

A gift card holder in accordance with a video gift card holder format allows the user to upload their own personal video file which is then downloaded onto the video card holder via USB or other operable means such as wireless radio signal (e.g. Wifi or Bluetooth) thus allowing the recipient to initiate playback upon receipt of the gift card held within the holder.

As an initial step, a user accesses the system interface and selects a holder design and, in certain embodiments, enters text in customizable fields. Next, the user may upload an image, such as a photograph, logo or other graphic. The user then selects whether to record a video segment using the user computer camera or to upload a video message file via remote computer or mobile device. The recorded video segment is stored in a video message file saved to a system server. The video gift card holder cover is printed and bound to the video gift card holder frame. The video message file is loaded to the video gift card holder video storage module via selected connection mode at a system production facility. A gift card is attached to or within the video gift card holder and the holder is conveyed to the recipient via US mail or other mail delivery service.

A video teaser is a video file which can be provided along with a gift card and gift card holder to communicate a particular sentiment, occasion, or gift card brand experience. The video teaser is typically personalized by uploading the gift card recipient's photo to a system central server. Text content can be added to certain customizable text fields such as recipients name, occasion, or sentiment. Upon the uploading of personalized content, the video is then rendered or composited to include the personalized content. The video teaser is sent ahead of the actual gift card, via email link to view the video, in order to create excitement, anticipation, and imagination of the possibilities of a special gift arriving soon, thus extending the gifting experience to multiple days.

Typically a user first selects a video teaser from among several prerecorded videos that may be viewed on or from a system interface. Next, the user uploads a photograph of the recipient, enters the recipient's name in a text box, selects an appropriate occasion or sentiment from among several provided by the system, and enters the recipients email address. Upon uploading the photograph, it may be edited as described above. In some embodiments, additional text fields may be provided to receive additional user text. The photograph and text are then rendered into the selected video based on pre-defined fields within the video thereby creating an augmented reality experience for the recipient. The user is provided with an option to preview the video and make changes to the user information. When the user is satisfied with the video it is saved to a central server. Upon completing the transaction via a payment/checkout procedure, an email message is sent to recipient with link to view the video.

The invention claimed is:

1. One or more non-transitory computer-readable media storing computer-executable instructions that, when executed by a processor, perform a method of presenting a user interface to a user in order to deliver a gift card presentation to a recipient, the method comprising the steps of:

generating, at a server, a web page including a gift card presentation template interface, wherein the gift card presentation template interface includes:
        a first control allowing the user to select an occasion for a gift card to be presented to the recipient;
        a second control allowing the user to populate a first field of a gift card presentation template with user-supplied content;
        a third control allowing the user to select system-provided video content to populate a second field of the gift card presentation template;
        a fourth control allowing the user to specify a denomination for the gift card; and
        a fifth control allowing the user to provide information identifying the recipient;
    compositing a teaser video based at least in part on and including at least some of the user-supplied information;
    compositing the user-supplied content, the video content, and the denomination to create the gift card presentation based on the gift card presentation template;
    using the information identifying the recipient to deliver the teaser video to the recipient via email; and
    delivering the gift card presentation to the recipient.

2. The media of claim 1, wherein the user-supplied content is textual content.

3. The media of claim 1, wherein the gift card presentation template interface further includes a sixth control allowing the user to select a gift card presentation template from a plurality of provided gift card presentation templates.

4. The media of claim 1, wherein system-provided audio content is further included in the gift card presentation.

5. The media of claim 1, wherein the method further comprises receiving from the user the specified denomination provided by the user by typing in a desired denomination amount.

6. One or more non-transitory computer-readable media storing computer-executable instructions that, when executed by a processor, perform a method of presenting a user interface to a user in order to deliver a gift card presentation to a recipient, the method comprising the steps of:

displaying, to the user, a gift card presentation template interface;
    receiving, from the user, a selection of an occasion for a gift card to be presented to the recipient;
    receiving, from the user, user-supplied textual content to populate a first field of the gift card presentation template;
    receiving, from the user, user-supplied video content to populate a second field of the gift card presentation template;
    receiving, from the user, a selection of a denomination for the gift card from a system-provided set of denominations to populate a third field of the gift card presentation template;
    receiving, from the user, information identifying the recipient of the gift card, including the recipient's name and email address;
    populating the first field of the gift card presentation template with the user-supplied textual content and the second field of the gift card presentation template with the user-supplied video content to generate:
        a teaser video based at least in part on and comprising at least some of the user-supplied information;
    delivering the teaser video to the recipient based on the information identifying the recipient; and
    delivering the gift card presentation to the recipient.

7. The media of claim 6, wherein the method further comprises the step of receiving, from the user, a selection of a gift card presentation template from a plurality of provided gift card presentation templates.

8. The media of claim 6, wherein user-provided audio content is further included in the gift card presentation.

9. One or more non-transitory computer-readable media storing computer-executable instructions that, when executed by a processor, perform a method of presenting a user interface to a user in order to deliver a gift card presentation to a recipient, the method comprising the steps of:

generating, at a server, a web page including a gift card presentation template interface, wherein the gift card presentation template interface includes:
        a first control allowing the user to select a gift card presentation template from a plurality of provided gift card presentation templates;
        a second control allowing the user to populate a first field of the gift card presentation template with user-supplied textual content;
        a third control allowing the user to populate a second field video of the gift card presentation template with video content;
        a fourth control allowing the user to specify a denomination for the gift card from a system-provided set of denominations; and
        a fifth control allowing the user to provide information identifying the recipient, comprising a name and email address of the recipient;
    compositing the user-supplied textual content, the video content, and the denomination to create:
        a teaser video based at least in part on and comprising at least some of the user-supplied information; and
        the gift card presentation based on the gift card presentation template;
    using the information identifying the recipient to deliver to the recipient the teaser video and the gift card presentation.

10. The media of claim 9, wherein the video content is user-supplied video content.

11. The media of claim 9, wherein the video content is system-provided video content.

12. The media of claim 9, wherein audio content is further included in the gift card presentation.

13. The media of claim 9, wherein method further comprises receiving from the user the specified denomination provided by the user by typing in a desired denomination amount.

\* \* \* \* \*